(12) United States Patent  
Giraldo et al.

(10) Patent No.: US 7,972,006 B2  
(45) Date of Patent: Jul. 5, 2011

(54) APPARATUS, SYSTEM, AND METHOD FOR THE DESKTOP-BASED CREATION, MANAGEMENT, AND PUBLICATION OF ENHANCED AUDIOVISUAL PRESENTATIONS

(75) Inventors: Hernan Giraldo, Dallas, TX (US); Robert J Malli, Falls Church, VA (US)

(73) Assignee: Promptvideo Corporation, Dallas, TX (US)

( * ) Notice: Subject to any disclaimer, the term of this patent is extended or adjusted under 35 U.S.C. 154(b) by 76 days.

(21) Appl. No.: 12/343,840

(22) Filed: Dec. 24, 2008

(65) Prior Publication Data

US 2009/0153804 A1 Jun. 18, 2009

Related U.S. Application Data

(63) Continuation of application No. 11/145,082, filed on Jun. 3, 2005, now Pat. No. 7,481,539.

(51) Int. Cl.  
*G03B 21/14* (2006.01)

(52) U.S. Cl. .............................. 353/28; 353/98; 348/14.1

(58) Field of Classification Search .................... 353/28, 353/98, 122; 359/7, 8, 9, 629, 930, 633; 348/14.08, 14.1  
See application file for complete search history.

(56) References Cited

U.S. PATENT DOCUMENTS

| 2,007,012 | A | | 7/1935 | Troendly |
| 4,821,307 | A | * | 4/1989 | Flint, III ..................... 348/14.01 |
| 5,619,254 | A | | 4/1997 | McNelley |
| 5,900,907 | A | * | 5/1999 | Malloy et al. ................ 348/14.1 |
| 6,042,235 | A | | 3/2000 | Machtig et al. |
| 6,104,424 | A | | 8/2000 | McNelley |
| 6,280,039 | B1 | | 8/2001 | Barber |
| 6,379,009 | B1 | | 4/2002 | Fergason |
| 7,123,285 | B2 | * | 10/2006 | Smith et al. ................. 348/14.05 |
| 7,126,816 | B2 | * | 10/2006 | Krah ......................... 361/679.55 |
| 2001/0038412 | A1 | * | 11/2001 | McNelley et al. ............ 348/14.1 |
| 2002/0033879 | A1 | * | 3/2002 | Yoshimoto et al. ......... 348/14.08 |
| 2004/0227693 | A1 | | 11/2004 | Rambo et al. |
| 2008/0088696 | A1 | | 4/2008 | Giraldo |

* cited by examiner

*Primary Examiner* — William C Dowling

(57) ABSTRACT

A software apparatus for the user-friendly, desktop-based authoring, creation, management, and publication of a personal, enhanced audiovisual presentation comprising a software program which automatically captures and encodes the audiovisual presentation recorded by the user using the webcam, allows the user to edit an application-imported textual resume and synchronize parts of the textual resume with segments of the recorded audiovisual presentation, assigns a URL to the completed enhanced audiovisual presentation, and. A computer teleprompter especially adapted for use with the disclosed apparatus for desktop-based recording of an enhanced audiovisual presentation comprising a front enclosure with an opening, a webcam mount, a webcam position adjustment knob attached to the webcam mount, a lower mirror, and a beam splitter mirror with a transmission-to-reflection ratio that is adapted for use with a webcam.

5 Claims, 9 Drawing Sheets

Synchronize your Video with your Bio Segments

Step5

| Introduction | 0 : 1 | Synchronize |
| Skill Snapshot | 1 : 57 | Synchronize |
| Experience | 1 : 0 | Synchronize |
| Education | 0 : 21 | Synchronize |
| Awards Received | 1 : 39 | Synchronize |
| Interests | 2 : 38 | Synchronize |
| References | 2 : 15 | Synchronize |

Update

```
<body onLoad="switchOn()">
    <p>
        <object classid="clsid:655D22F0-66DB-4883-AF13-1B1C888521E5" width="260" height="24
  name="BNControl" CODEBASE="http://www.camsume.com/camsumecapture.CAB#version=3,1,0,247">
       <param name="ASFVideoStreams" value="1">
       <param name="ASFVideoMBR" value="true">
       <param name="ASFLiveStream" value="0">
       <param name="ASFSCR_Enable" value="-1">
       <param name="BackColor" value="0">
       <param name="AutoConnect" value="0">
       <param name="VideoFormat" value="0">
       <param name="LimitEnabled" value="true">
       <param name="TimeLimit" value="180">
       <param name="CaptureControls" value="1">
       <param name="AccountID" value="bnathan">

<param name="ASFAU_Format" value="9">
       <param name="ASFVID_Bitrate" value="60">
       <param name="ASFVID_Width" value="176">
       <param name="ASFVID_Height" value="144">
       <param name="ASFVID_FPS" value="15">
       <param name="ASFVID_Quality" value="75">
       <param name="ASFVID_SecPerKey" value="10">

<cfoutput>
       <param name="UploadURL" value="http://www.videoresume.biz/video_upload.cfm?resume_no=#ur
       <param name="URLVideoConnectError" value="http://www.camsume.com/connecterror.cfm">
       <param name="URLNoHardware" value="http://www.camsume.com/nohardware.cfm">
       <param name="URLCaptureFinished" value="javascript:postIt('#url.resume_no#')">
       <param name="UploadBaseName" value="video">
       <param name="SessionID" value="#session.resume_id#">
       </cfoutput>
</object>
```

FIG. 7

APPARATUS, SYSTEM, AND METHOD FOR THE DESKTOP-BASED CREATION, MANAGEMENT, AND PUBLICATION OF ENHANCED AUDIOVISUAL PRESENTATIONS

CROSS-REFERENCE TO RELATED APPLICATIONS

This patent application is a continuation of and claims priority to patent application Ser. No. 11/145,082 filed on Jun. 3, 2005 entitled Apparatus, System, and Method for the Desktop-Based Creation, Management, and Publication of Enhanced Audiovisual Presentations which in turn claims priority from provisional Patent Application No. 60/577,655 filed on Jun. 7, 2004, the contents of each of which are incorporated by reference in their entirety herein.

TECHNICAL FIELD OF THE INVENTION

The disclosed invention relates to apparatus and systems for the generation of digital audiovisual presentations from a user's desktop. More specifically, and not by way of limitation, the disclosed invention is directed to an apparatus for the creation, capture, management, and distribution over the Internet or an Intranet of an enhanced digital audiovisual presentation such as a user's video resume directly from the user's desktop.

Audiovisual presentations are familiar tools in education, training, sales, and marketing. However, the use of pre-recorded audiovisual presentations by job candidates in their job search is a relatively recent phenomenon. The challenge to the job candidate is to efficiently create an audiovisual presentation and then to efficiently distribute it. While webcams are available today for the creation of audiovisual recordings from a computer user's desktop, the capability to readily capture the recorded audiovisual presentation in a suitable digitized format for efficient distribution to a target audience remains a challenge and is one of the problems addressed by the disclosed invention.

Businesses have sprung up which provide facilities where job candidates can go to record professional video resumes which the service then digitizes and offers to host on a website. Other services, such as cyberview.com, travel to the office site of the job candidate, film at that site, then host the video resume. Still other services, such as ueditvideo.com, create a multimedia resume on a compact disc, called "CD REZ," based on data (edited video, transcript, academic resume, athletic resume, and other inputs) provided by the customer. These services are inefficient and relatively expensive methods for the creation of a professional personal video resume.

Other services enable the job candidate to independently create video resumes. For example, services such as videopop.net and seriousmagic.com, enable computer users to author their personal video resume using a software wizard which directs the user through the video authoring process directly from the user's desktop. Each of these sites configures and displays a video tool as a window next to the textual resume. The video tool enables playback of the video resume. Neither of these applications however discloses methods for enhancement of the video via synchronization with text, neither discloses an apparatus which is specially designed to help users create more professional audiovisual presentations straight from their computer desktop station, and neither discloses a system for the immediate publication and distribution of the video resume over the Internet.

U.S. Patent Application 20030066029 by Vizina is directed to a system for the computer-based method of creating a multimedia resume and storing the multimedia resume in a form suitable for electronic dissemination to hiring personnel. The resume-creating software permits the user to incorporate into the multimedia resume separate components such as a text file, digital photo, and a video from a source such as an off-board multimedia program. The Vizina application however is not directed to an apparatus which facilitates the creation of professional quality enhanced audiovisual presentations from a user's desktop station.

U.S. Pat. No. 5,592,375 issued to Salmon, et. al, is directed to a computer-implemented system which assists employers in identifying job candidates which match criteria specified by the employer. The invention discloses a multimedia database which contains descriptive information (called a Product Profile) about a job candidate in complex configurations called a Product Tables. The employer accesses the database via an interface and can query the database. Per one feature of the Salmon patent, the system suggests questions to the candidate and prompts the job candidate to answer the question in a video clip stored in a table of the job candidate's Product Profile. The Salmon patent, however, is not directed to a producer (job candidate)-focused apparatus and system for the efficient desktop-based creation, modification, capture, and instantaneous publication over a network of a professional audiovisual presentation synchronized with text.

Formats for textual resumes have become somewhat standardized in part to promote efficiency in the process of identification of qualified candidates. Thus, textual resumes generally have standard sections and section headings, such as for example Objective, Education, Professional Work History, and References. Hiring authorities have become accustomed to screening resumes for qualified candidates by a cursory reference to specific sections of the resume that are of particular interest to the hiring authority. What is needed is a simple, user-friendly system for a job candidate's efficient desktop-based creation of personal audiovisual resumes which are enhanced to utilize the standardized format of textual resumes that hiring authorities have come to expect.

SUMMARY OF THE INVENTION

The disclosed invention is directed to the apparatus and computer-implemented system, and method for the creation, modification, capture, and distribution of an enhanced digital audiovisual presentation by the producer (herein called user) directly from the user's desktop. To practice the disclosed invention, a user must have access to a computer equipped with an operating system, a connection to the Internet, a browser for access to the Worldwide Web, and a multimedia player, computer monitor, keyboard, one available USB port, a video capture device such as a web cam, and input/output connections for audio. Additional hardware which will help the user produce a more professional presentation includes a lapel microphone to be placed on the user's body, a portable computer station light source, and a personal computer teleprompter. The disclosed invention is also directed to and includes a design for a teleprompter specially made for use with the disclosed system.

The preferred embodiment of the computer teleprompter incorporates a webcam as part of the design such that the computer teleprompter serves both as a webcam for recording audiovisual presentations using the disclosed invention and as a teleprompter to help guide the user to keep his/her eyes directly at the camera during the recording process. The computer teleprompter comprises a front enclosure piece which has a window opening and which supports a splitter mirror in its upper portion and a lower mirror, and a back enclosure piece which is removably attached to the front enclosure piece and supports a webcam, has a means to adjust the position of the webcam, and a monitor clip to help secure the computer teleprompter to a computer monitor. The splitter mirror per the preferred embodiment for the computer teleprompter has a transmission-to-reflection ratio which was optimized for a webcam after experimentation. Thus, while teleprompters collaborating with conventional cameras utilize a splitter mirror with a transmission-to-reflection ratio of 60/40, the splitter mirror per the preferred embodiment for the disclosed computer teleprompter has a transmission-to-reflection ratio of 75/25. Note, however, that the applicant expressly does not disclaim other ratios because other ratios, including 60/40 work but may not be optimal., a webcam mount, monitor clip, a front enclosure comprising a view window, a splitter mirror optimized for use with a webcam opposed to a conventional video camera. The user installs the webcam by connecting it to the USB port on the user's computer. The user must access the application software that is a critical part of the disclosed invention. The application software (herein Application Tool) resides on the application host server (herein Authoring Server) and the user may access it by visiting the host's website and registering as a user. When the registered user is ready to begin the application, the Application Tool will automatically install the correct Operating System (OS) drivers and test the configuration. An important aspect of the disclosed invention is the way the Application Tool captures, via an Active-X Control, the recorded audiovisual presentation and automatically formats it to any of the standard video encoding technologies.

A registered user can do any of the following actions while on-line in his/her account at the application host website: View a previously created and captured audiovisual presentation, delete a previously captured audiovisual presentation, edit a previously captured audiovisual presentation, create a new audiovisual presentation, and distribute a previously captured audiovisual presentation.

Another feature of the preferred embodiment enables the user to purchase additional hosting time for the application beyond the initial period offered as part of the initial purchase. Hosting time refers to the amount of time that the published audiovisual presentation is live on-line and available for streaming to viewers who access the URL assigned to the distributed audiovisual presentation. A feature of the disclosed invention for managing a distributed video resume enables the user to view a report screen listing viewing attributes for the distributed audiovisual presentation. For example, the user will be given information on each viewer, including viewer's domain name, date of the viewing session, and duration of the viewing session.

The user who desires to create a new audiovisual presentation is prompted by the Application Tool through the following steps:

a. Manually input a TITLE for the audiovisual presentation. The TITLE is any word, phrase, or sentence chosen by the user to refer to the audiovisual presentation. In the preferred embodiment, the TITLE includes the name of the job seeker and the job title of the position he/she is seeking.

b. Upload to the application server a previously prepared textual document which in the preferred embodiment represents the user's resume. The document may be uploaded from any source, whether the user's computer, or from a source outside of the user's computer, such as via a link to a page on a website. The uploading step creates a link from the audiovisual presentation being created to the textual resume. Viewers of the distributed audiovisual presentation will be able to view the textual resume because of the link created by the uploading step.

c. Choose a presentation template from a number of available templates provided by the application tool. The presentation template gives options for presentation attributes such as layout, font, and size of the video screen, colors, and an audio-only option.

d. Manually input names for sections of the audiovisual presentation being created. These sections are called "Headings" in the application tool. The user may choose to create no heading, one heading, or more than one heading. The user is free to use a single word, a phrase, or a sentence as the heading. In the preferred embodiment of the disclosed invention the Headings are names for standard parts of a textual resume such as but not limited to "Objective," "Education," "Employment History," and "References."

e. Manually input CONTENT for each HEADING created using a WYSIWYG (What You See Is What You Get) Editor. The user determines what content is appropriate for any given HEADING. The content for each HEADING may be cut and pasted from the uploaded textual resume if a resume document was uploaded. Alternatively, the CONTENT may be a fresh script which the user drafts for use in the recording.

f. The user is prompted to review CONTENT for each HEADING.

g. The user is prompted to either upload previously recorded video and audio files or to record a new audiovisual presentation. This feature enables the use of more complex production-style quality multimedia presentations as part of the disclosed invention. If the user chooses to upload a previously recorded multimedia file, then the user can immediately take steps to synchronize the uploaded file with the Headings created.

h. The user who chooses to record a new audiovisual presentation sets up the hardware and the physical space for the recording session at the member's desktop. If the user has not already done so, the user connects the web cam or video capture device to the USB port of the user's computer. The application will install the correct Operating System drivers and test the configuration. The user installs the computer teleprompter (if any) on the computer monitor, adjusts the light source (if any), adjusts the microphone and the position of the web cam, and sets up as appropriate background skins.

i. Once the physical set up is completed, the user, seated at his/her computer desktop station, records a video resume by speaking while looking directly at the web cam or computer teleprompter (if used) screen. The recording time is variable, however, longer video resumes require more storage space on servers and thus are more costly to manage. If using the computer teleprompter, the user is able to adjust the scroll speed for the text that appears in the teleprompter viewer. The computer teleprompter will help the user to relax, look directly at the camera, and deliver a more professional presentation. The length of video resumes in the preferred embodiment is five minutes. The application tool has an Active-X Control embedded in the browser of the user's computer which automatically and directly accomplishes encoding of the video into any of the standardized formats (e.g., Windows Media, Real Media, Flash Video, or other format for non-windows operating systems). The captured video is automatically encoded at an application determined bandwidth. The control can encode at low and high quality bandwidth.

j. When the user is finished recording, he/she indicates that the recording is complete by clicking STOP, and is then given the opportunity to review the recorded video. After the recording is complete, the video resume has been captured and encoded.

k. If the user has created Headings, then he/she is prompted to synchronize the Headings with the appropriate points in the recorded video. The user can accomplish synchronization by playing the video and clicking on the SYNCHRONIZE tab which corresponds to the HEADING whose content is being discussed on the video resume. Alternatively, the user may accomplish synchronization by playing the video, noting the time on the video clock that corresponds to any given HEADING, typing that time next to the HEADING and clicking on the SYNCHRONIZE tab for that HEADING.

l. The user is prompted to create a still snapshot for use as a visual representation of the video resume to be displayed to the viewer on the home page of the audiovisual presentation accompanied by the TITLE. The user determines the content for the snapshot, but most commonly the snapshot will be a personal portrait-style photograph if the audiovisual presentation is a video resume. Alternatively, the user may import an image from another source.

m. The user is prompted to review the video resume before deciding whether or not to publish it.

n. If the user decides to not publish the audiovisual presentation, he/she is prompted by the application to re-record the audiovisual presentation. If the user chooses to not re-record at this time, then the just-recorded or uploaded presentation is stored on the database server of the disclosed system for the user's later access and retrieval via his/her account.

o. If the user decides to publish the audiovisual presentation, then the application automatically assigns and communicates to the user a hyperlinked unique URL address for the audiovisual presentation. As soon as the unique URL address is assigned to the presentation, the video resume is immediately published on the Internet and available for viewing to anyone who types in the correct URL address in a search engine.

6. Once a video resume is created, captured, and published, the user may independently market and advertise his/her video resume by notifying individuals and business entities, such as via electronic mail, about the existence of the audiovisual presentation and its URL. In addition, the user may save the audiovisual presentation, along with the textual resume, to a compact disk (CD) or a digital video disk (DVD) and distribute the CD or DVD using traditional methods including mailing the CD or DVD. In the preferred embodiment, the video resume is hosted on-line by a service which negotiates for and places links for the video resume at various on-line websites such as job boards.

7. Another aspect of the disclosed invention is the Presentation Viewing Utility which enables visitors to the URL of the audiovisual presentation to experience the video resume on demand by typing the URL address in the browser of the visitor's computer or by clicking on a hyperlinked URL address of the presentation as found on various web sites such as on-line job boards). Within the Presentation Viewing Utility, the visitor to the URL may play (i.e., stream) the video resume, view the snapshot and TITLE, stream selected (synchronized) segments of the video resume by clicking on the hyperlinked and synchronized Headings which then causes the utility to display HEADING CONTENT associated with the Heading's as the appropriate segment of the video resume is streamed, download and print the textual resume by clicking on the icon displayed and associated with this functionality, and send an electronic mail message to the user directly by clicking on the envelope icon displayed.

While the preferred embodiment discloses an application directed toward a video resume for use by job seekers (or more generally, individuals promoting their special skill and talent), it will be obvious to individuals of ordinary skill in the art that the disclosed system is equally applicable to other uses where promotion of oneself and one's skills and capabilities is not the main objective.

The apparatus and system disclosed herein may be used by various individuals to create short personal audiovisual presentations whose primary purpose is to communicate information to a target audience/viewer with the personal touch made possible by digital video technology. For example, and not by way of limitation, the disclosed invention may be used for the following varied purposes: medical professional, mental health professional, and/or a social worker talking on a topic of general public health concern or of specific interest to a particular patient (e.g., detailed description of a contemplated surgical procedure, post-operative care instructions, nutritional counseling, managing grief, critic (amateur or professional) delivering a book, music, or film review; beauty consultant discussing a treatment protocol, political candidate detailing his/her platform or other message.

In summary, the disclosed apparatus, method, and system enable anyone with a computer to readily, quickly, frequently, and inexpensively create, manage, and distribute on-line, directly from his/her desktop, a custom, personal audiovisual presentation authored for various purposes.

It will be obvious based on the above disclosure that there are additional ways, within the scope of the disclosed invention, to further enhance the audiovisual presentation under the disclosed system and method. For example, per the preferred embodiment for video resumes, the video resume may show, in addition to the job candidate, other speakers such as the candidate's reference named on the textual resume. The reference could speak about his/her experience with the job candidate. The recording of the reference segment of the video resume may be done at the job candidate's desktop as part of a single continuous audiovisual presentation. Alternatively, the reference may independently record the audiovisual presentation at his/her desktop using the disclosed Application Tool. The presentation recorded and captured by the reference could then be electronically disseminated to the job candidate who will upload it to his account, and enhance it as appropriate using the Application Tool.

The scope of the disclosed invention includes the computer-implemented business method for hosted distribution over the Internet of audiovisual presentations created and/or enhanced using the Application Tool that is the heart of the disclosed invention. A preferred embodiment of the business method comprises a hosting service (a website) which performs the following functions: (1) stores audiovisual presentations of its registered users on a database, and (2) streams the presentations (and displays their synchronized textual enhancements) via an interface which individuals access by typing the unique URL address preassigned to each presentation. The interface captures and makes available to registered users of the hosting service certain information about the hits or visits to each URL, such as for example the domain name of the visitor to the URL, date of the visit, and duration of the presentation viewing session. The hosting service advertises its database at various sites such as but not limited to job posting boards and resume posting services.

BRIEF DESCRIPTION OF THE DRAWINGS

FIG. 7 shows sample code attributes of the Active-X Control;

DETAILED DESCRIPTION OF THE DRAWINGS

The disclosed invention will be better understood by reference to the drawings per FIGS. 1 through 8 discussed in detail below. The reader is advised that some of the content, especially content per FIGS. 6 and 7 below, contains copyrighted material and material protected by trademark and trade dress. The applicants reserve all rights therein.

It will be obvious to one of ordinary skill in the programming art how to program each of the functionalities which comprises the disclosed computer-implemented invention as discussed below. The scope of the disclosed invention encompasses all equivalents of the structures and functions consistent with the spirit and intent of the invention.

Figure 1:
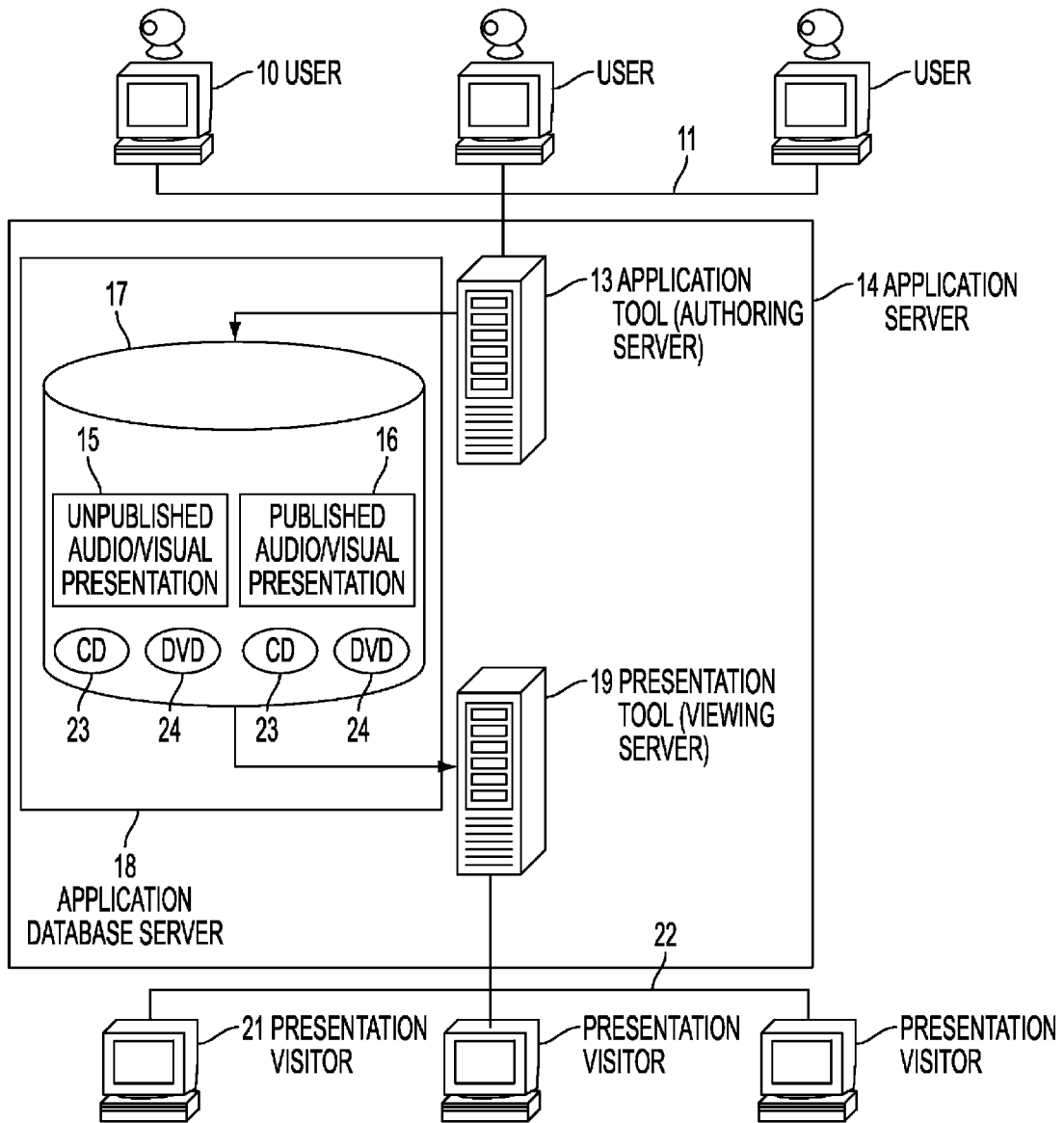
FIG. 1 is a block diagram of the overall system and its components.

FIG. 1 shows the major components and their interrelationships in the overall system disclosed for the web-based and desktop-based creation, modification, capture, publication, and distribution of enhanced digital audiovisual presentations by user-producers (hereafter referred to as users). FIG. 1 also shows components of the disclosed system which enable individuals (hereafter called Presentation Visitors) to access and view the audiovisual presentation created using the disclosed invention. Each of the components is described in detail below.

Per FIG. 1, User Computer 10 has a means 11 to connect to the Internet or an Intranet. Via a browser installed on User Computer 10, the User uploads the Application Tool 13 which resides on the Application Server 14. The output of the Application Tool 13 is either an Unpublished Audiovisual Presentation 15 or a Published Audiovisual Presentation 16, each of which is stored in a Presentation Database 17 which resides on the Application Database Server 18. The User can access the Unpublished Audiovisual Presentation 15 and the Published Audiovisual Presentation 16 from his/her account in the Application Tool 13. Individuals, herein called Presentation Visitors, interested in viewing the Published Audiovisual Presentation 16, can do so via an interface called the Presentation Tool 19 (or Presentation Viewing Utility), residing on the Application Server 14, which is accessible via a browser installed on the Presentation Visitor Computer 21 which is connected to the Internet or the Intranet via a connection 22. The User may save the Unpublished Audiovisual Presentation 15 to a compact disk (CD) 23 or digital video disk (DVD) 24 and then distribute the CD or DVD using traditional methods such as but not limited to electronic dissemination or mailing via the postal system.

Figure 2:
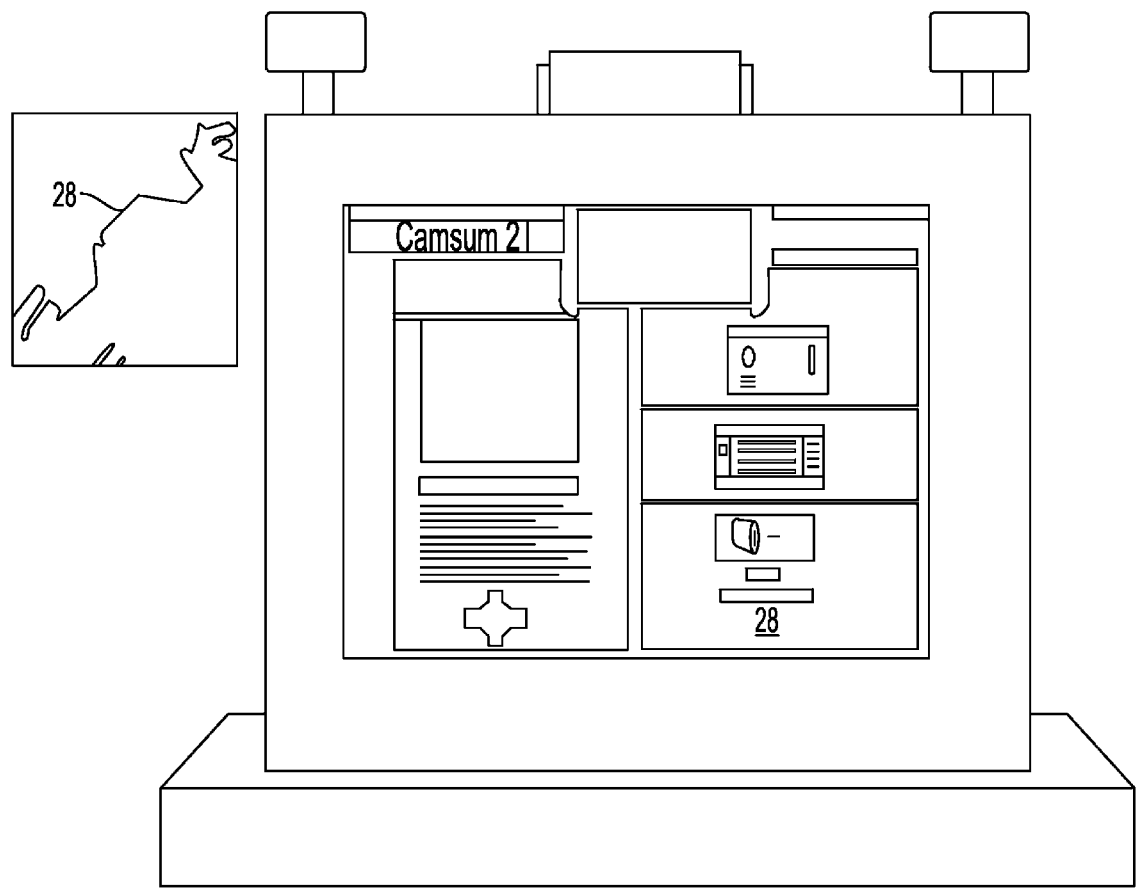
FIG. 2 is a diagram of the physical desktop set-up for practicing the disclosed invention.
Figure 9:
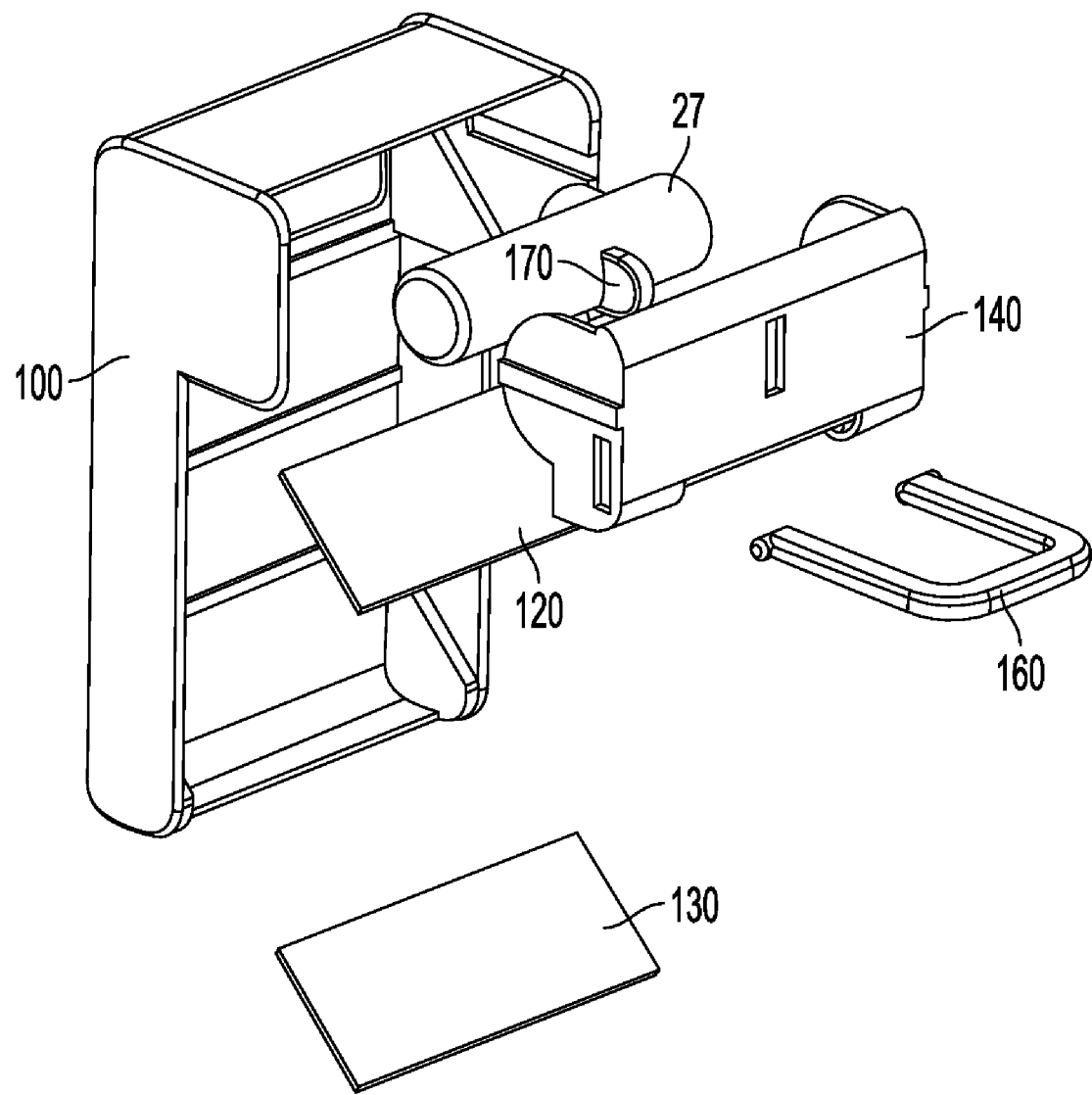
FIG. 9 is an exploded rear view of the preferred embodiment for the computer teleprompter.

FIG. 2 depicts the typical physical configuration for a User's desktop set-up to practice the disclosed invention. The physical set-up comprises the User's Computer 10 which has browser software 12, means 11 for connecting the User's Computer 10 to the Internet, a video capture device such as a web cam 27, microphone 28, computer teleprompter 29, optional computer light 30, and optional background screen 31. The hardware components herein listed will be known to one of ordinary skill in the webcasting art. The disclosed invention is also directed to a preferred embodiment of a novel computer teleprompter (see description of FIGS. 9 and 10 below) which was specially designed to cooperate with the disclosed system.

Figure 3:
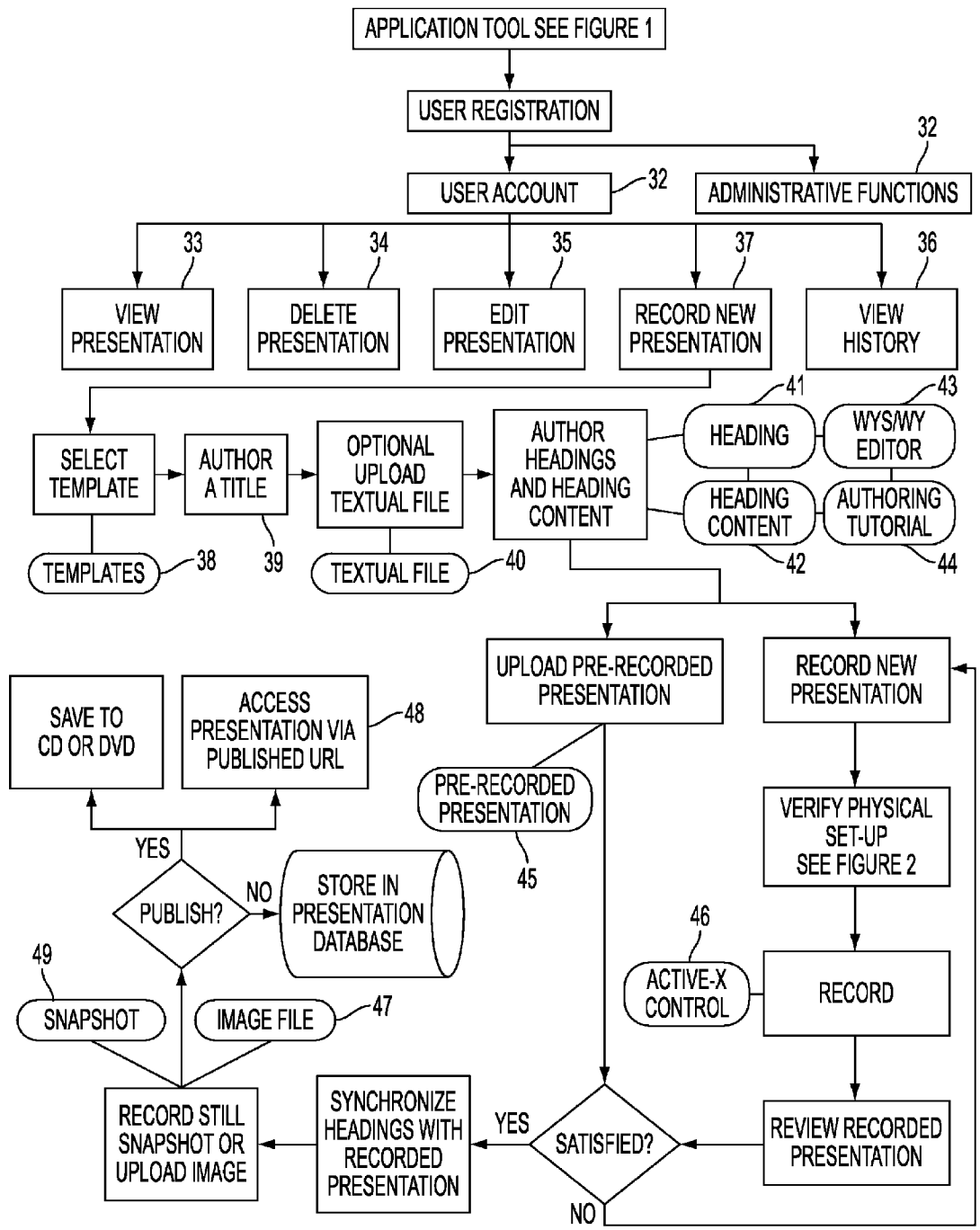
FIG. 3 is a flowchart of the Application Tool under the disclosed invention.

FIG. 3 describes in greater detail the functionalities which comprise the Application Tool 13. The Application Tool 13 is a web-based computer program wizard which prompts the User through the steps of registration, authoring and recording, enhancement, and capture of a digital Audiovisual Presentation from the User's Computer 10.

Registration

During registration, the User manually inputs using the computer keyboard identifying information such as but not limited to name, physical address, password, and credit card-related data. Successful registration creates a User's Account 32 which resides on the Application Server 14 and is accessible by the User upon input of proper User identifying information including password.

In the User's Account 32, the User may perform any of the following functions: view 33 a previously saved presentation, delete 34 the previously saved presentation, edit 35 the textual enhancements for the previously saved Unpublished Audiovisual Presentation or Published Audiovisual Presentation, view 36 log of hits (visits) to the URL of the current Published Audiovisual Presentation, author and record 37 a new audiovisual presentation, and/or perform miscellaneous administrative functions, including purchase of additional services such as for example hosting time for the Published Audiovisual Presentation.

Authoring and Recording of a New Presentation

To record a new presentation, the User is prompted to select a Presentation Template 38 from available stored templates in the Application Tool 13. Templates control presentation attributes such as but not limited to font for text used to enhance the presentation, layout of presentation components on the monitor screen, colors, graphics, video screen size, and an audio-only option.

The User is next prompted to author a Title 39 for the audiovisual presentation by manually inputting text via the computer keyboard. The title is any phrase, word, or sentence which the user selects to represent and describe the audiovisual presentation. In the preferred embodiment, the Title may be, but is not limited to, the user's name, address, telephone number, and a job title for the position sought.

The User is next prompted to upload a text-formatted Textual File 40 to the Application Server 14 from its location by typing that file's address. This is an optional step per the Application Tool 13 and is used when enhancement of the audiovisual presentation is desired. In the preferred embodiment, the Textual File 40 is the User's textual resume. The Textual File 40 may be uploaded from the User's Computer 10 or from any location on the World Wide Web. During the uploading step, a Java applet gives the User feedback as to how much of the file has been uploaded. The applet also validates the file type. The uploaded Textual File 40 is available to the User for display on the monitor of the User's Computer 10 during the authoring steps. It is noted that the uploading step creates a link 68 (also see FIG. 4) on the Published Audiovisual Presentation 16 to the Textual File 40. That link is available in the Presentation Tool 19 when Presentation Visitors view the Published Audiovisual Presentation 16.

The User is next prompted to author textual enhancements, if any, which will be displayed by the Presentation Tool 19 to Presentation Visitors during presentation viewing sessions. The textual enhancements comprise Headings 41 and Heading Content 42 which are determined by the User and manually input by the User via the computer keyboard and a What You See Is What You Get (WYSIWYG) Editor 43. A Heading 41 is a title for a particular section of the audiovisual presentation. Heading Content 42 refers to information which pertains to the corresponding Heading 41. Heading Content 42 may be harvested from the uploaded Textual File 40 or it may be freshly scripted by the User and manually input using the WYSIWYG Editor 43. The User may utilize the optional Resume Authoring Tutorial 44 to script the Heading 41 and Heading Content 42. In the preferred embodiment, Headings 41 are titles of sections of a standard textual resume. Thus, for example, and not by way of limitation, the following may be used as Headings: Introduction, Objective, Experience, Education, Awards, and References.

Next, the User may upload a Previously Recorded Audiovisual Presentation 45 or the User may record a new presentation. The option to upload a previously recorded and encoded audiovisual presentation provides for the use of more advanced production-style multimedia presentations as part of the disclosed invention. That option is available to more sophisticated users of the disclosed invention. The production-style multimedia presentation may have been recorded in a professional recording studio or at the User's desktop.

Before recording a new audiovisual presentation, the User configures and verifies the Physical Set-up at the User's desktop as detailed in FIG. 2 per discussion above. The User connects the video capture device 27 to the USB port of the User's Computer 10. The Application Tool 13 will automatically install the correct Operating System drivers and test the configuration. The User will then adjust the position of the web cam 27, User's microphone, computer light (if supplemental light source is used), and background screen (if one is used). The User will install and set-up the computer teleprompter on the monitor of the User's Computer 10.

Having set-up the desktop, the User initiates recording of the audiovisual presentation by clicking on RECORD. The User speaks while looking directly at the computer monitor or at the screen of the computer teleprompter. To indicate that recording of the audiovisual presentation is complete, the User clicks on STOP.

Capture of the Audiovisual Presentation

By way of the Active-X Control Program 46 which is embedded in the browser of the User's Computer by way of the Application Tool 13, the recording step automatically encodes the audiovisual presentation into any one of the standard formats for media files for both Windows and Non-Windows Operating Systems, such as but not limited to Window Media, Real Media, or Flash Video. The encoding is accomplished at an application determined bandwidth. The Active-X Control 46 is considered to be an important part of the disclosed invention and makes the disclosed invention user-friendly. The control can bind to any video capture device. The Active-X Control program regulates video attributes such as but not limited to the bit rate, recording time, and video dimensions. The recorded audiovisual presentation is automatically uploaded to the Application Server and becomes available for future retrieval and modification as appropriate.

Enhancement of the Audiovisual Presentation

The User can next enhance the audiovisual presentation by synchronizing it with the Headings. Synchronization may be accomplished via a "point and click" method. The User plays the presentation and clicks, at the appropriate time, on the "Synchronize" tab associated with the Heading whose content is being discussed at that point in the presentation. Alternatively, the User may manually input the time (as displayed by the clock which is part of the video media player tool) that corresponds to the start of discussion of Heading Content related to any given Heading. It is noted that the enhancement function per the disclosed invention is not limited to enhancement with a textual file. It will be obvious to one of ordinary skill in the art of creating presentations with the aid of computers that alternative enhancement methods are possible and are hereby considered to be within the scope of the disclosed invention. For example, the user may synchronize the audiovisual presentation with a multimedia file (audio, video, images such as static and moving characters, etc.).

The User next has the option to create a thumbnail image to represent the presentation. The User may record a still digital Snapshot 49 or upload a previously created image file 47. The thumbnail image will be displayed along with the Title of the presentation on the first page the Presentation Visitor sees upon accessing the URL 48 of the presentation. In the preferred embodiment, the thumbnail is a still portrait of the User taken at the User's desktop with the aid of the webcam.

Publication of the Audiovisual Presentation

The User next decides whether to publish the enhanced presentation. Publication of the audiovisual presentation makes the presentation immediately available for streaming and viewing on a network by way of the interface called the Presentation Tool 19. The publication step is accomplished in the Application Tool via computer code which assigns a unique URL address to the newly captured audiovisual presentation and/or uploaded, previously recorded audiovisual presentation and then immediately displays to the User the URL address assigned to the audiovisual presentation. The published presentation resides in the Presentation Database on the Application Database Server.

Bypassing the publication step, or in addition to the publication step, the User may opt to save the captured presentation on a compact disk (CD) 23 medium or a Digital Video Disk (DVD) 24 medium. The User may promote and distribute the CD 23 or DVD 24 via electronic dissemination or by mailing using the postal system.

Figure 4:
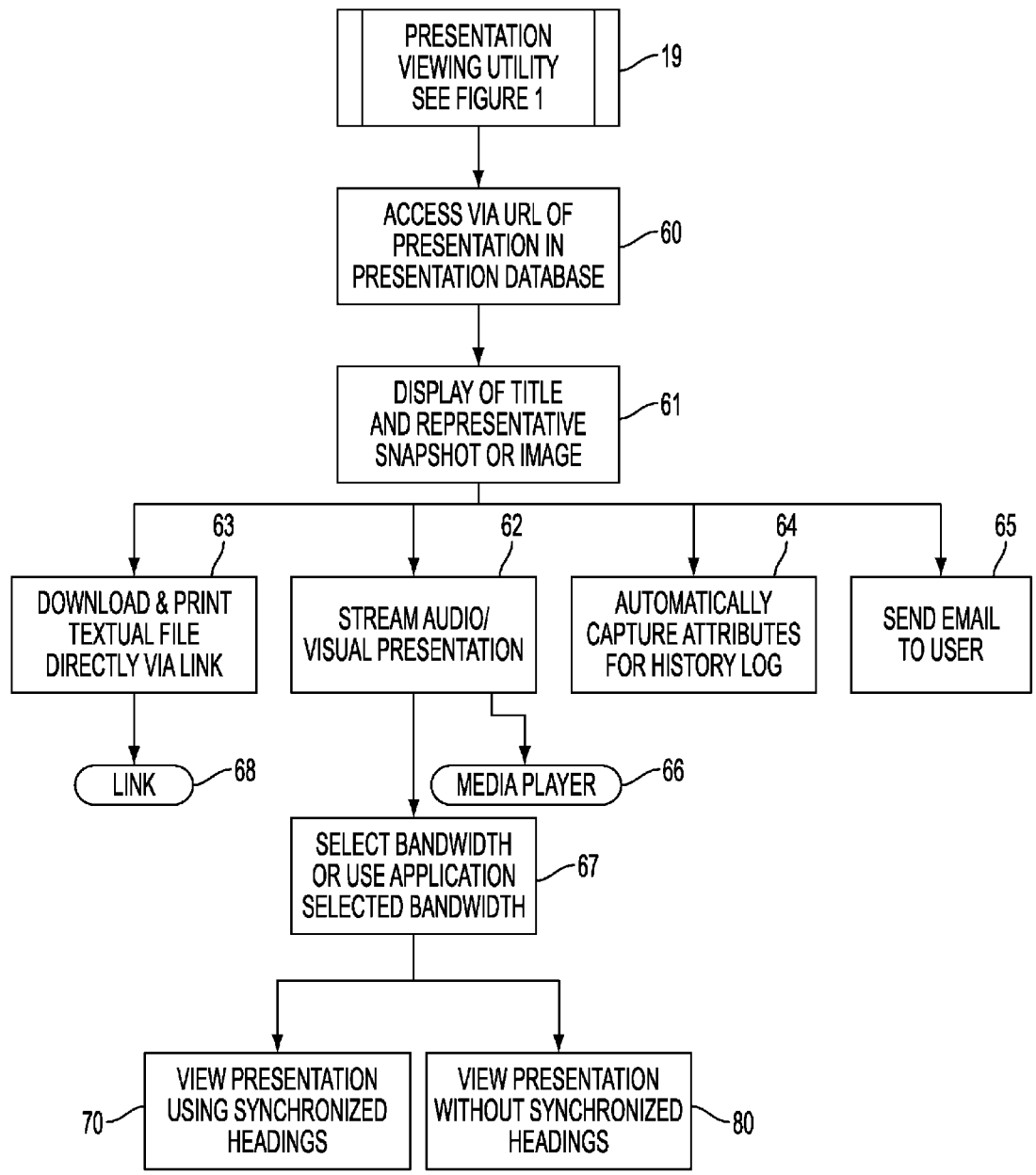
FIG. 4 is a flowchart of the Presentation Viewing Utility of the disclosed invention.

FIG. 4 is a block diagram showing the functionalities of the Presentation Tool 19 which enable presentation visitors to access 60 and stream 62 (with enhancements 70 or without enhancements 80) the published audiovisual presentations, print 63 the textual file (if any) associated with the published audiovisual presentation, display 61 the Title and Snapshot or Image File associated with the presentation, and send 65 an electronic communication to the author/owner of the published presentation.

The Presentation Tool (or the Presentation Viewing Utility) 19, which resides on the Application Server 14, is an interface between the Presentation Database 17 and the Presentation Visitor's Computer 21. The Presentation Visitor wishing to view a Published Audiovisual Presentation accesses the URL 48 of that presentation by way of the browser on his/her computer. The media player 66 downloaded to the Presentation Visitor's Computer streams the Published Audiovisual Presentation on demand. The Presentation Visitor may select playback 67 at either high or low bandwidth or he/she may select the option whereby the Presentation Tool itself determines the appropriate bandwidth for streaming the presentation based on the Presentation Visitor Computer's configuration. The Presentation Tool also has means for synchronized play of the Published Audiovisual Presentation and concurrent display of the Heading and Heading Content. The Presentation Tool displays the Title and representative Still Snapshot 49 or Uploaded Image 47 of the Published Audiovisual Presentation. The Presentation Visitor may send an electronic mail message to the User (by, e.g., clicking on the displayed envelope icon which automatically accesses the Presentation Visitor's default mail client program). Finally, the Presentation Visitor may print the uploaded Textual File associated with the presentation via the link 68 displayed on the Presentation Visitor Computer screen shown as an icon.

The Presentation Tool also comprises means 64 for capturing certain attributes for each hit (i.e., session by visitor to the presentation) and transferring the data to a log which is accessible to the user in his/her User Account 32. The Visiting Session Attributes include but are not limited to the domain name of the Presentation Visitor, the date of the visit to the URL of the presentation, and the duration of the visit to the URL.

Figure 5:
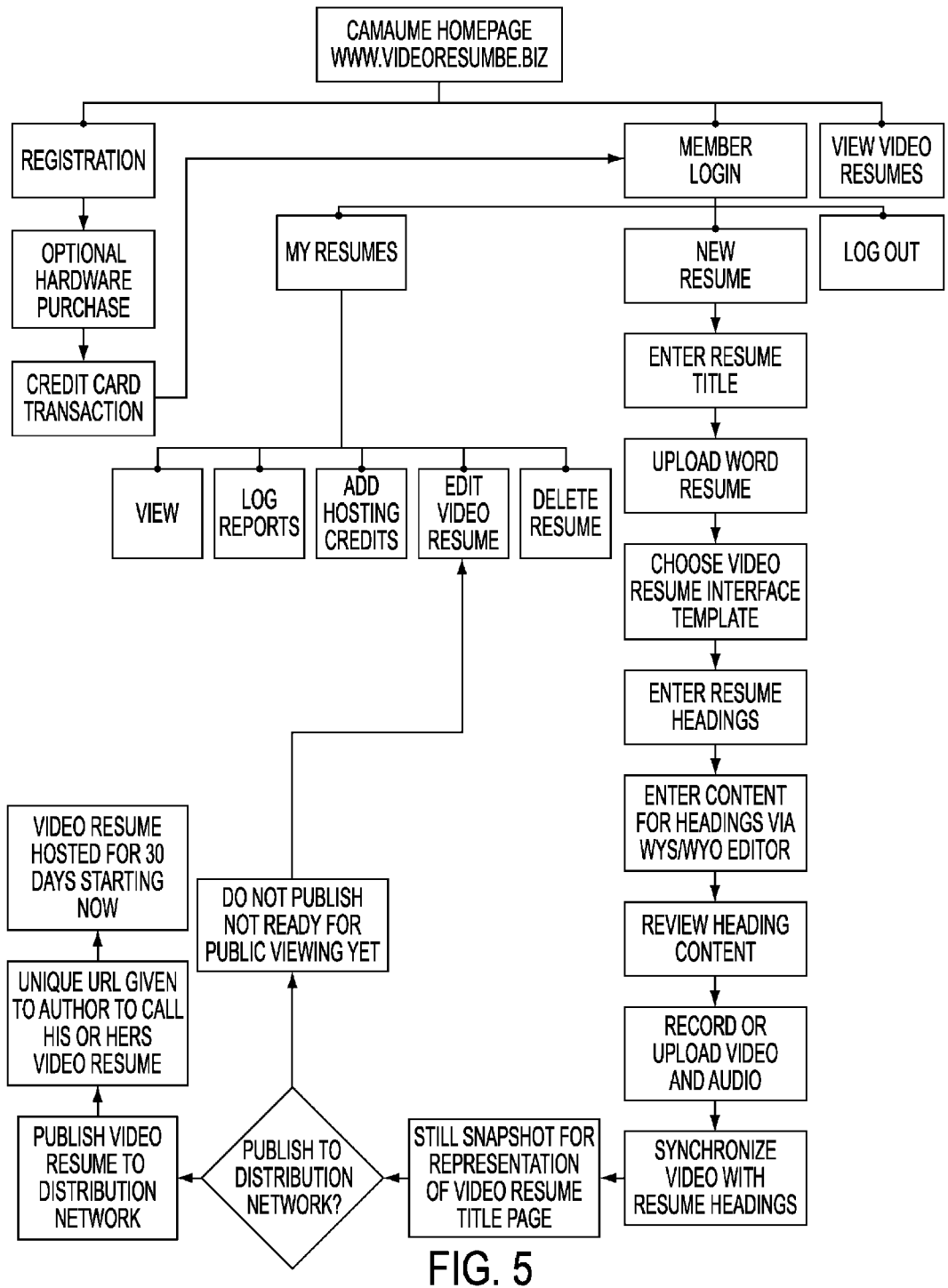
FIG. 5 is a flowchart of the preferred embodiment for video resumes.

FIG. 5 is a detailed flowchart of the system and method per the preferred embodiment where the audiovisual presentation is a video resume. The steps in the disclosed method for the preferred embodiment are described above in detail in the section entitled Summary of the Invention.

Figure 6:
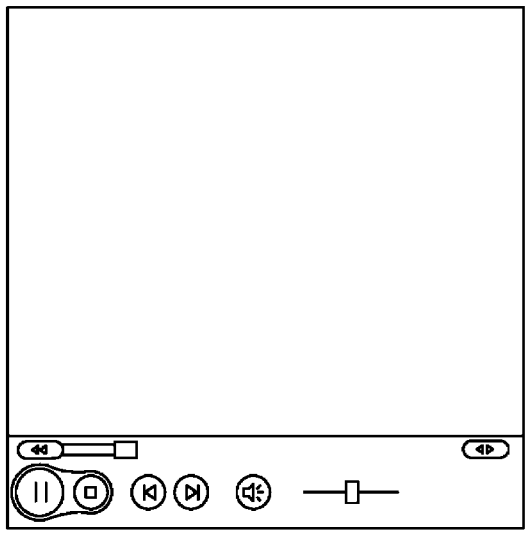
FIG. 6 is a sample data screen of the Application Tool per the preferred embodiment.

FIG. 6 shows a sample screen in the Application Tool per a prototype of the preferred embodiment for video resumes.

FIG. 7 shows sample code under the Active-X Control Program developed for a prototype of the preferred embodiment for video resumes.

Figure 8:
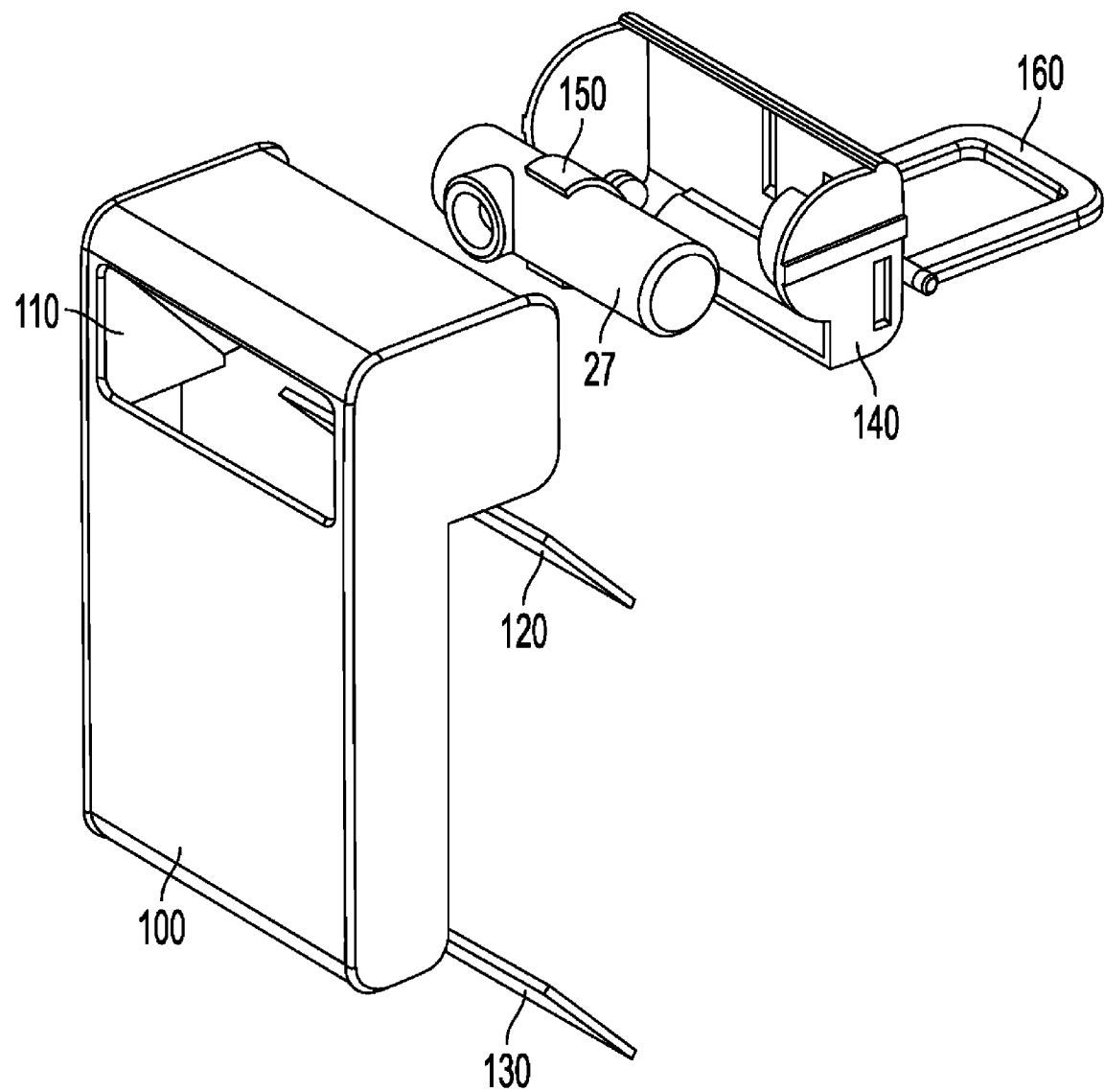
FIG. 8 is an exploded front view of the preferred embodiment for the computer teleprompter.

FIG. 8 is an exploded front view of the preferred embodiment for a computer teleprompter 29 for use with the disclosed invention. The computer teleprompter comprises a front enclosure 100 which comprises an opening or window 110 in its upper portion and which removably houses a beam splitter mirror 120 and a lower mirror 130, a back enclosure 140 which houses a webcam 27, a webcam mount 150, and a removable monitor clip 160.

What is claimed is:

1. A computer teleprompter device for placement on a personal computer monitor to help a user look directly at the webcam while recording an audiovisual presentation at the user's desktop, comprising:
   a front housing with an opening, said front housing adapted to be mounted on and to rest on a computer monitor;
   a back housing comprising a webcam mount wherein said back housing is removably attached to the back of the top portion of the front housing;
   a beam splitter mirror attached to the front housing near the opening in the front housing and below the webcam mount, said beam splitter mirror having a transmission-to-reflection ratio that is adapted for use with a webcam; and
   a lower mirror attached to the front housing.

2. The computer teleprompter device of claim 1 comprising a webcam position adjustment knob attached to the webcam mount.

3. The computer teleprompter device of claim 1, wherein the beam splitter mirror has a transmission-to-reflection ratio of approximately 75/25.

4. The computer teleprompter device of claim 1, wherein, the personal computer is a laptop computer.

5. The computer teleprompter device of claim 1 comprising a webcam placed inside the webcam mount.

* * * * *